United States Patent
Tu et al.

(10) Patent No.: US 12,549,700 B2
(45) Date of Patent: Feb. 10, 2026

(54) STEREO CAMERA AND DESIGN METHOD THEREOF

(71) Applicant: Acer Incorporated, New Taipei (TW)

(72) Inventors: Tsung-Wei Tu, New Taipei (TW); Yi-Jung Chiu, New Taipei (TW); Wei-Kuo Shih, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 18/806,694

(22) Filed: Aug. 15, 2024

(65) Prior Publication Data

US 2025/0350714 A1    Nov. 13, 2025

(30) Foreign Application Priority Data

May 9, 2024    (TW) .................................. 113117157

(51) Int. Cl.
*H04N 13/239*    (2018.01)
*G03B 35/08*    (2021.01)
*H04N 13/302*    (2018.01)

(52) U.S. Cl.
CPC ........... *H04N 13/239* (2018.05); *G03B 35/08* (2013.01); *H04N 13/302* (2018.05); *H04N 2213/001* (2013.01)

(58) Field of Classification Search
CPC ............... H04N 13/239; H04N 13/302; H04N 2213/001; G03B 35/08
USPC .......................................................... 348/47
See application file for complete search history.

(56) References Cited

U.S. PATENT DOCUMENTS

| 6,271,876 | B1 | 8/2001 | McIntyre et al. |
| 6,512,892 | B1* | 1/2003 | Montgomery ....... H04N 13/239 396/326 |
| 2013/0148944 | A1* | 6/2013 | Ando .................. G11B 27/034 386/278 |
| 2013/0179297 | A1* | 7/2013 | Yamakaji ............... G02C 7/027 351/159.01 |
| 2020/0260945 | A1* | 8/2020 | Cui ......................... G06F 3/013 |

FOREIGN PATENT DOCUMENTS

| CN | 1837951 | 9/2006 |
| CN | 106097367 | 11/2016 |
| CN | 107917701 | 4/2018 |
| JP | 6588970 | 10/2019 |
| TW | 394860 | 6/2000 |
| TW | 201133124 | 10/2011 |

* cited by examiner

*Primary Examiner* — Susan E. Hodges
(74) *Attorney, Agent, or Firm* — JCIPRNET

(57) ABSTRACT

A stereo camera includes a first lens, a second lens, a first image sensor and a second image sensor. The first lens has a first nodal point and a first optical axis passing through the first nodal point. The second lens has a second nodal point and a second optical axis passing through the second nodal point. The first lens and the second lens are spaced apart along a lens arrangement direction. The first image sensor disposed corresponding to the first lens has a first photosensitive surface. The second image sensor disposed corresponding to the second lens has a second photosensitive surface. The first optical axis is parallel to the second optical axis. In the lens arrangement direction, a geometric center of the first photosensitive surface is offset from the first optical axis, and a geometric center of the second photosensitive surface is offset from the second optical axis.

4 Claims, 7 Drawing Sheets

STEREO CAMERA AND DESIGN METHOD THEREOF

CROSS-REFERENCE TO RELATED APPLICATION

This application claims the priority benefit of Taiwan application serial no. 113117157, filed on May 9, 2024. The entirety of the above-mentioned patent application is hereby incorporated by reference herein and made a part of this specification.

BACKGROUND

Technical Field

The disclosure relates to a camera and a design method thereof, and more particularly, to a stereo camera and a design method thereof.

Description of Related Art

The applications of stereoscopic displays are very diverse, including audiovisual entertainment, industrial design and medical imaging. In order to allow the user to have stereoscopic vision, the display panel needs to show two images with disparity respectively to both eyes of the user. These two images, after being receiving respectively by the left and right eyes, are fused in the brain to produce stereoscopic vision. However, when there is a significant difference between the depth distribution of the displayed objects and the actual position of the display panel, known as vergence-accommodation conflict (VAC), some users may experience discomfort symptoms such as dizziness and nausea, which may affect their viewing comfort.

SUMMARY

The disclosure provides a stereo camera and a design method thereof, which may enhance user's comfort when viewing the reproduced three-dimensional (3D) images of the captured content.

A stereo camera in the disclosure includes a first lens, a second lens, a first image sensor and a second image sensor. The first lens has a first nodal point and a first optical axis passing through the first nodal point. The second lens has a second nodal point and a second optical axis passing through the second nodal point. The first lens and the second lens are spaced apart along a lens arrangement direction. The first image sensor is disposed corresponding to the first lens and has a first photosensitive surface. The second image sensor is disposed corresponding to the second lens and has a second photosensitive surface. The first optical axis is parallel to the second optical axis. A geometric center of the first photosensitive surface is offset from the first optical axis along the lens arrangement direction. A geometric center of the second photosensitive surface is offset from the second optical axis along the lens arrangement direction.

A design method for a stereo camera in the disclosure includes determining a total disparity $P_d$ of a first image and a second image respectively viewed by a user's eyes on a display surface of a display panel according to a display pixel density and a viewing distance of the display panel and determining a node spacing between a first nodal point of a first lens and a second nodal point of a second lens of the stereo camera according to a photographing distance of a target object to be photographed relative to a virtual connection line of the first nodal point and the second nodal point, the total disparity $P_d$, a focal length of each of the first lens and the second lens, a sensing pixel density of each of a first image sensor and a second image sensor of the stereo camera, and a sum of an offset of a geometric center of a first photosensitive surface of the first image sensor relative to a first optical axis of the first lens and an offset of a geometric center of a second photosensitive surface of the second image sensor relative to a second optical axis of the second lens. The first optical axis passes through the first nodal point. The second optical axis passes through the second nodal point. The first optical axis is parallel to the second optical axis.

Based on the above, in the stereo camera and the design method thereof of an embodiment of the disclosure, two optical axes of two lens spaced apart are parallel to each other, and a geometric center of a photosensitive surface of each of two image sensors disposed corresponding to the two lens is offset from the optical axis of the corresponding lens. According to the application requirements of different products, the offset of the geometric center of the photosensitive surface relative to the optical axis of the lens can be adjusted to allow captured images of the target object to be displayed with appropriate depth distribution in front of the user through the display panel, and thereby improving the comfort of the user's stereoscopic vision.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
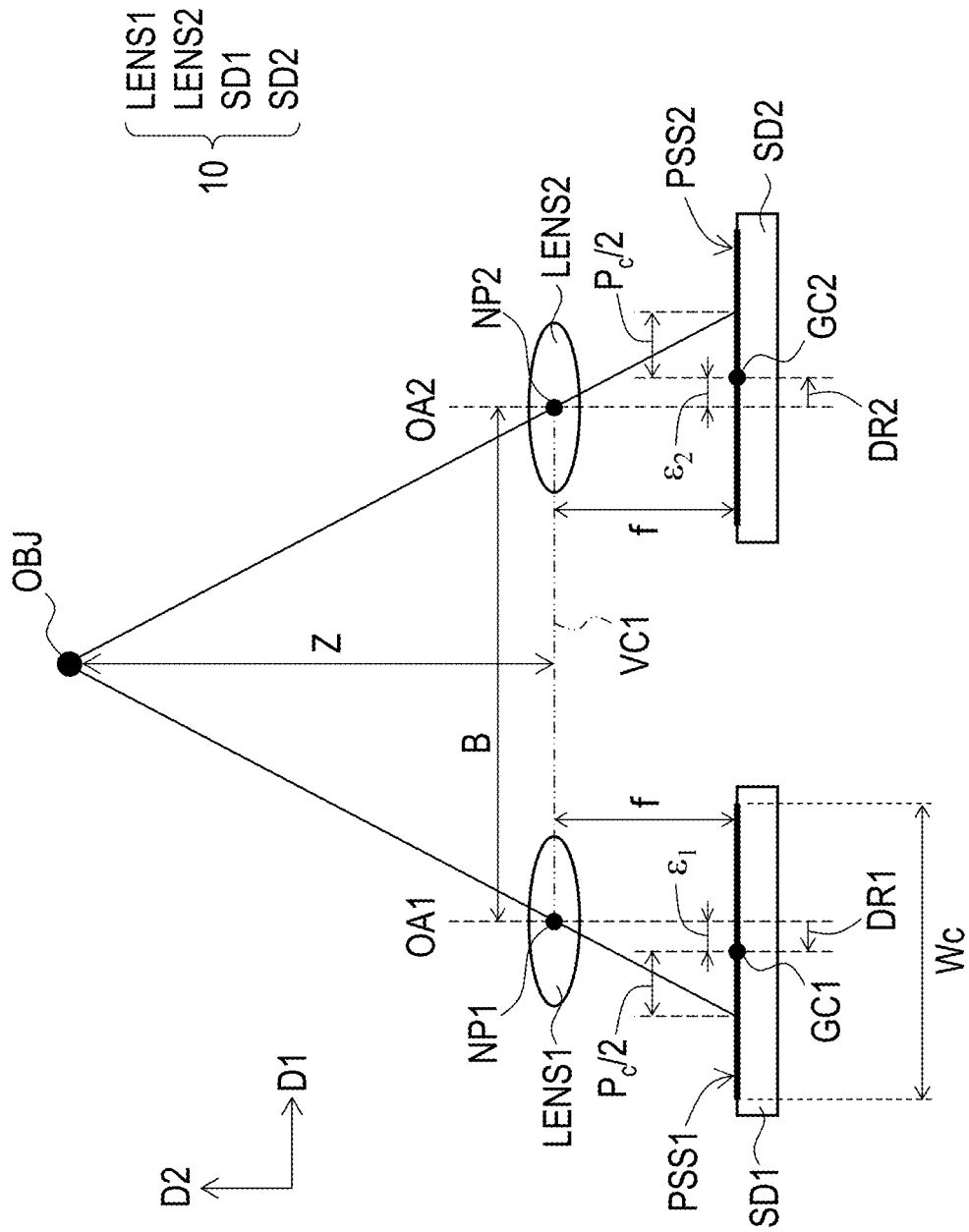
FIG. 1 is a schematic top view of a stereo camera according to an embodiment of the disclosure.

In the figures, for clarity, the thicknesses of, for instance, layers, films, panels, and regions are enlarged. It should be understood that, when a layer, film, region, or a device of a substrate is "on" another device or "connected to" another device, the device may be directly on the other device or connected to the other device, or an intermediate device may also be present. On the other hand, when a device is "directly on another device" or "directly connected to" another device, an intermediate device is not present. As used in the present specification, "connected to" may refer to a physical and/or electrical connection. Furthermore, "electrically connected" may mean that other devices are present between two devices.

Reference will now be made in detail to the exemplary embodiments of the disclosure, examples of which are illustrated in the accompanying drawings. Whenever possible, the same reference numerals are used in the drawings and descriptions to refer to the same or similar parts.

Figure 2:
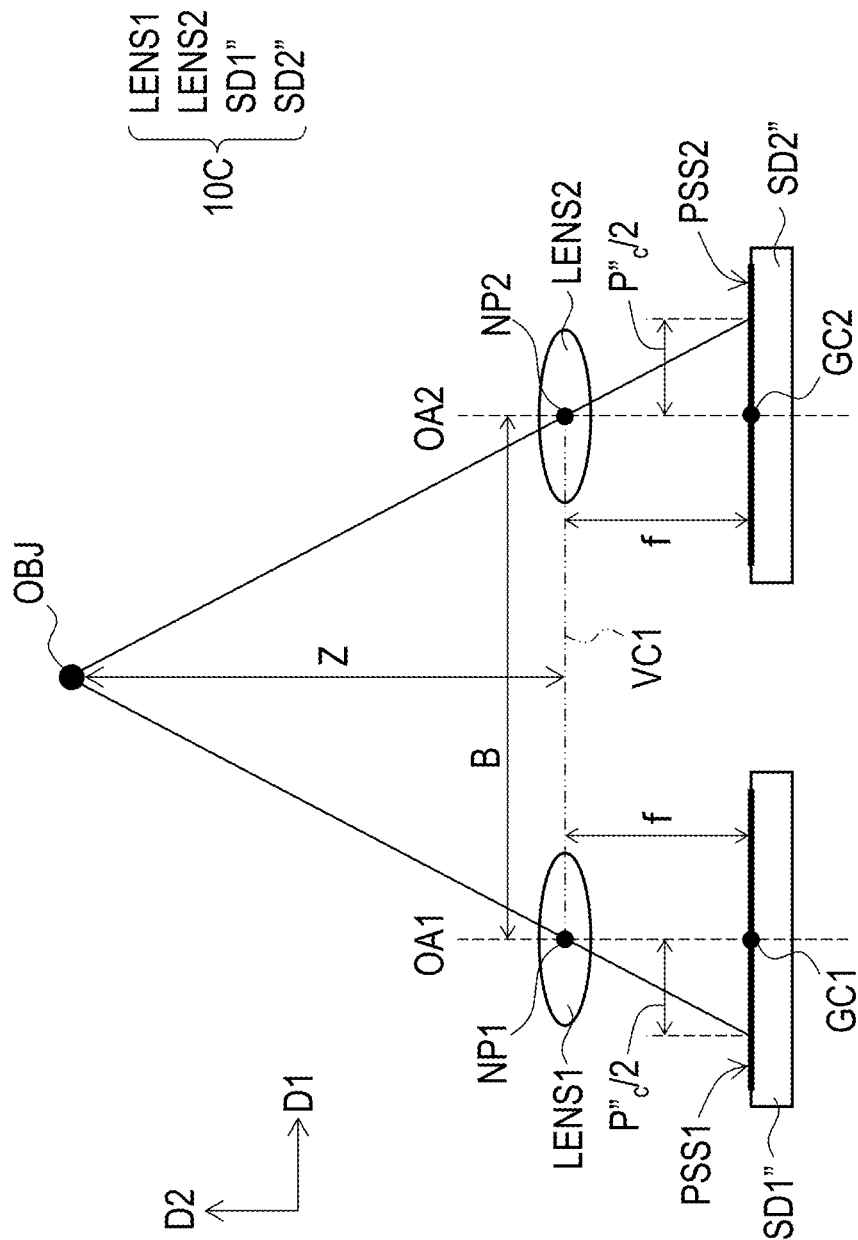
FIG. 2 is a schematic top view of a stereo camera of a comparative example.
Figure 3:
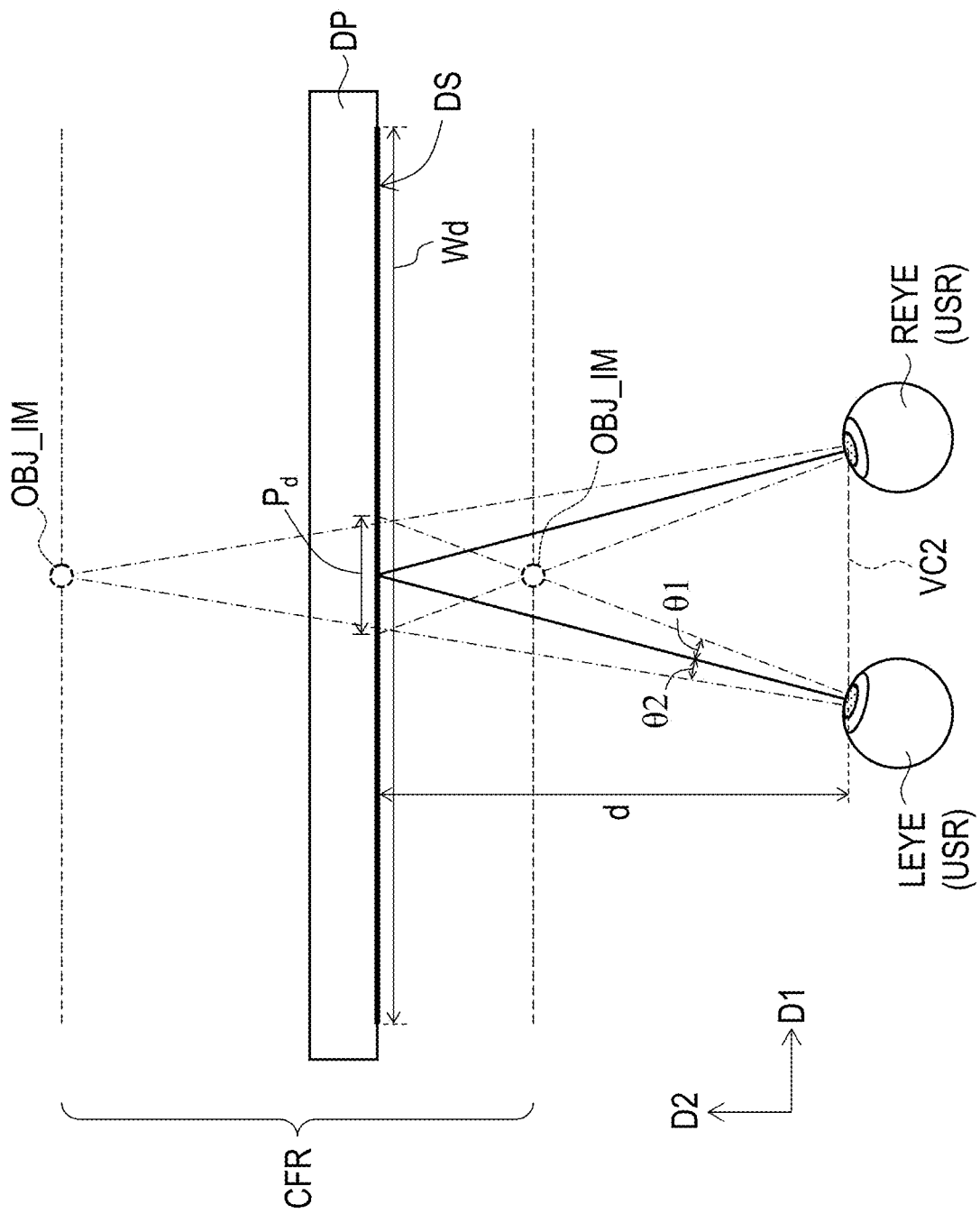
FIG. 3 is a schematic top view of a display panel when providing stereoscopic vision to a user.

FIG. 1 is a schematic top view of a stereo camera according to an embodiment of the disclosure. FIG. 2 is a schematic top view of a stereo camera of a comparative example. FIG. 3 is a schematic top view of a display panel when providing stereoscopic vision to a user.

Referring to FIG. 1, a stereo camera 10 includes a first lens LENS1, a second lens LENS2, a first image sensor SD1 and a second image sensor SD2. The first image sensor SD1 and the second image sensor D2 are arranged corresponding to the first lens LENS1 and the second lens LENS2, respectively. More specifically, the first image sensor SD1 and the first lens LENS1 may constitute a camera module, and the second image sensor SD2 and the second lens LENS2 may constitute another camera module.

Through the configuration of the two camera modules, the stereo camera 10 is adapted to capture two images of a target object OBJ at different viewing angles, that is, the two images have parallax.

The first lens LENS1 has a first node point NP1 and a first optical axis OA1 passing through the first nodal point NP1. The second lens LENS2 has a second nodal point NP2 and a second optical axis OA2 passing through the second nodal point NP2. The first lens LENS1 and the second lens LENS2 are spaced apart along a lens arrangement direction (for example, direction D1). The node spacing between the first nodal point NP1 and the second nodal point NP2 along the lens arrangement direction is B. The node spacing B herein is a baseline of the two camera modules mentioned above. The nodal point is, for example, an optical center of the lens, that is, the light passing through the nodal point of the lens does not undergo any deflection of the optical path.

In the embodiment, the first axis OA1 of the first lens LENS1 is parallel to the second optical axis OA2 of the second lens LENS2. An axial direction (for example, direction D2) of each of the first optical axis OA1 and the second optical axis OA2 is perpendicular to the lens arrangement direction. That is, the stereo camera in the embodiment adopts a parallel camera architecture.

In detail, the first image sensor SD1 and the second image sensor SD2 respectively have a first photosensitive surface PSS1 and a second photosensitive surface PSS2. The first photosensitive surface PSS1 is arranged at a focal length f of the first lens LENS1, and the second photosensitive surface PSS2 is arranged at a focal length f of the second lens LENS2. The first image sensor SD1 and the second image sensor SD2 are, for example, complementary metal oxide semiconductor (CMOS) image sensors or charge-coupled device (CCD) image sensors, but the disclosure is not limited thereto.

It should be noted that a geometric center GC1 of the first photosensitive surface PSS1 is offset from the first optical axis OA1 of the first lens LENS1, and a geometric center GC2 of the second photosensitive surface PSS2 is offset from the second optical axis OA2 of the second lens LENS2. More specifically, an offset direction DR1 of the geometric center GC1 of the first photosensitive surface PSS1 relative to the first optical axis OA1 is opposite to an offset direction DR2 of the geometric center GC2 of the second photosensitive surface PSS2 relative the second optical axis OA2. In the embodiment, an offset E1 of the geometric center GC1 of the first photosensitive surface PSS1 relative to the first optical axis OA1 is equal to an offset 82 of the geometric center GC2 of the second photosensitive surface PSS2 relative to the second optical axis OA2.

Furthermore, the first image sensor SD1 is adapted to capture a first lens image of the target object OBJ via the first lens LENS1, and the second image sensor SD2 is adapted to capture a second lens image of the target object OBJ via the second lens LENS2. In the embodiment, a distance of the target object OBJ relative to a virtual connection line VC1 between the first nodal point NP1 and the second nodal point NP2 is Z. The photographing distance Z herein is, for example, a distance between the target object OBJ and the virtual connection line VC1 along the direction D2 (that is, perpendicular to the lens arrangement direction).

Specifically, a sum $\varepsilon_{ps}$ of the offset E1 of the geometric center GC1 of the first photosensitive surface PSS1 relative to the first optical axis OA1 and the offset 82 of the geometric center GC2 of the second photosensitive surface PSS2 relative to the second optical axis OA2 satisfies the following relation 1:

$$\varepsilon_{ps} = P_c - \left(\frac{f \times B}{Z}\right) \times m_c,$$

where $m_c$ denotes a sensing pixel density of each of the first photosensitive surface PSS1 and the second photosensitive surface PSS2 along the lens arrangement direction, and $P_c$ denotes a total disparity of the first lens image and the second lens image.

The aforementioned sensing pixel density is, for example, a ratio of the number of sensing pixels arranged in a row along the direction D1 of each of the first image sensor SD1 and the second image sensor SD2 to a width Wc of a distribution range of the sensing pixels along the direction D1. The total disparity $P_c$ of the first lens image and the second lens image is, for example, a sum of an offset (for example, $P_c/2$) of an imaging position of the target object OBJ on the first photosensitive surface PSS1 relative to the geometric center GC1 and an offset (for example, $P_c/2$) of an imaging position of the target object OBJ on the second photosensitive surface PSS2 relative to the geometric center GC2.

It should be noted first that the captured target object can be presented with appropriate depth distribution in front of the user by offsetting the geometric center of the photosensitive surface relative to the optical axis of the lens, which helps to improve the comfort of the stereoscopic vision.

Referring to FIG. 1 and FIG. 2, in a stereo camera 10C of a comparative example, the geometric center GC1 of the first photosensitive surface PSS1 of the first image sensor SD1" is not offset from the first optical axis OA1 of the first lens LENS1, and the geometric center GC2 of the second photosensitive surface PSS2 of the second image sensor SD2" is not offset from the second optical axis OA2 of the second lens LENS2. That is, the first optical axis OA1 passes through the geometric center GC1 of the first photosensitive surface PSS1, and the second optical axis OA2 passes through the geometric center GC2 of the second photosensitive surface PSS2.

It should be particularly noticed that the offset (for example, P"$_c$/2) of the imaging position of the target object OBJ on the photosensitive surface relative the geometric center is greater than the offset (for example, P$_c$/2) of the embodiment due to the geometric center of the photosensitive surface of the image sensor of the comparative example is not offset from the optical axis of the lens. In other words, the disparity of the image of the target object OBJ on the photosensitive surface is adjusted by offsetting the image sensor relative to the optical axis of the lens, and thereby the captured images of the target object can be presented to the user with an appropriate depth distribution through the display panel. It should be noted that the offset of the photosensitive surface of the aforementioned image sensor may be adjusted according to the application requirement of different products, but the disclosure is not limited thereto.

Referring to FIG. 1 and FIG. 3, the image of the target object OBJ captured by the stereo camera 10 may be displayed to a user USR through the display panel DP. More specifically, the display panel DP is adapted to display the first image and the second image respectively on a display surface DS according to the first lens image captured by the first image sensor SD1 and the second lens image captured by the second image sensor SD2. The first image and the second image, after being receiving respectively by the left eye LEYE and the right eye REYE of the user USR, are fused in the brain of the user USR to generate stereoscopic vision of a target object image OBJ_IM at a specific depth.

In order to avoid uncomfortable symptoms such as dizziness or nausea due to the VAC (vergence-accommodation conflict) effect when the user USR watches a stereoscopic image with depth distribution, the imaging depth of the target object image OBJ_IM may be restricted within a comfort region CFR. The range of the comfort region CFR herein can be defined according to a viewing distance d between the display surface DS of the display panel DP and a virtual connection line VC2 of the eyes of the user USR and the results of human factors experiments.

For example, when the target object image OBJ_IM is imaged in front of the display panel DP (that is, floating out of the screen), an included angle between an accommodation direction and a convergence direction of the human eye is θ1 and is defined as negative value. When the target object image OBJ_IM is imaged behind the display panel DP (that is, sunk into the screen), an included angle between the accommodation direction and the convergence direction of the human eye is θ2 and is defined as a positive value. In the embodiment, the included angle θ1 and the included angle θ2 are, for example, −0.5° and +0.5° respectively, and a region between two imaging positions of the target object image OBJ_IM corresponding to these two included angles is defined as the comfort region CFR.

Therefore, in the embodiment, a total disparity P$_d$ of the aforementioned first and second images on the display surface DS of the display panel DP may satisfy the following relation 2:

$$P_d = \pm 2d \times \tan(0.5°) \times m_d,$$

where m$_d$ denotes a display pixel density of the display surface DS along an arrangement direction of eyes (for example, direction D1). The display pixel density is, for example, a ratio of the number of display pixels of the display panel DP arranged in a row along the direction D1 to a width Wd of a distribution range of the display pixels along the direction D1.

In addition, the total disparity P$_c$ of the first lens image and the second lens image captured by the stereo camera 10 and the total disparity P$_d$ of the first image and the second image on the display panel DP have to satisfy the following relation 3:

$$P_d = P_c \times S,$$

where S denotes a ratio of the number of display pixels of the display panel DP arranged in a row along the arrangement direction of eyes to the number of sensing pixels of each of the first image sensor SD1 and the second image sensor SD2 arranged in a row along the lens arrangement direction.

Figure 4:
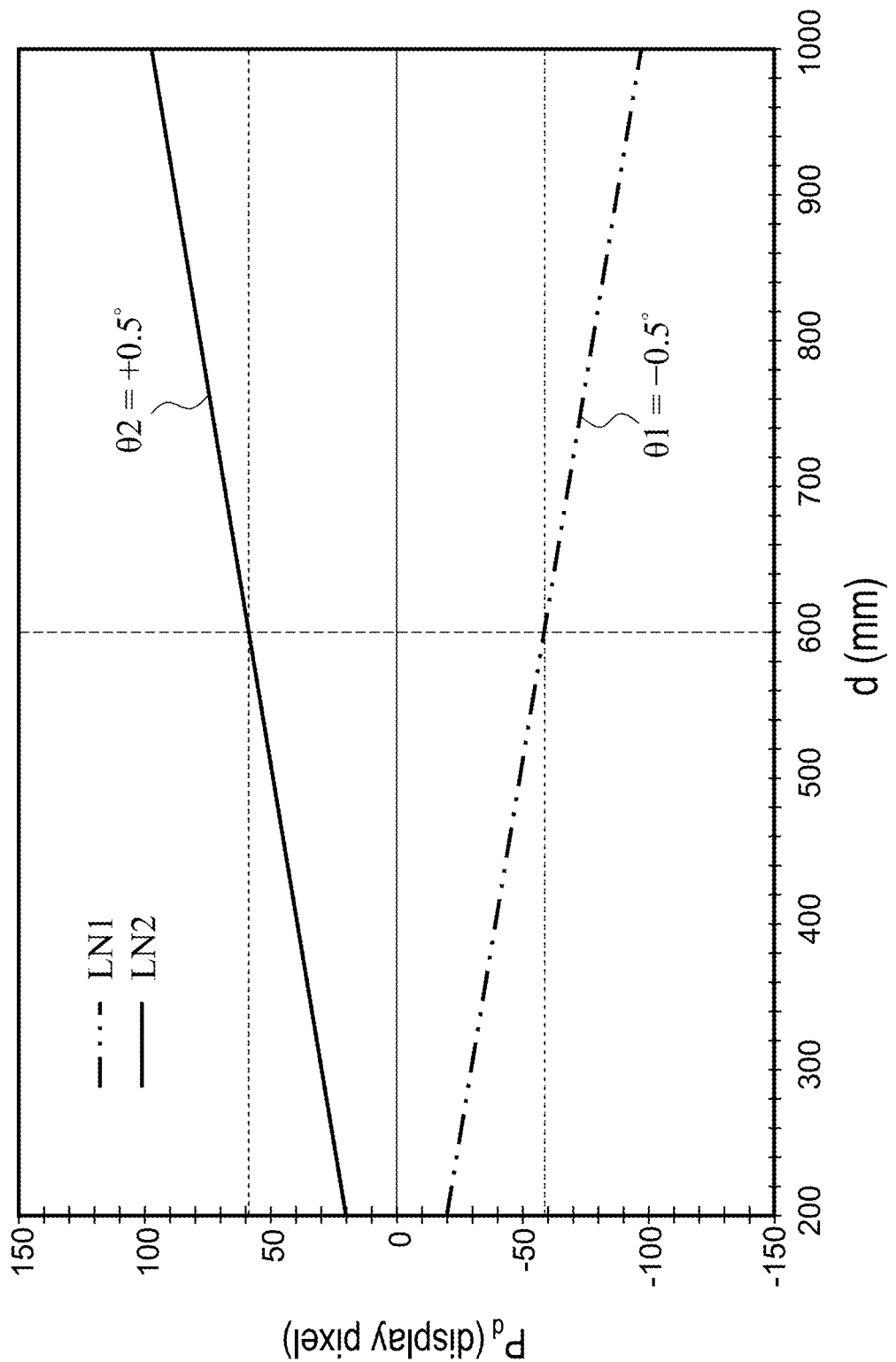
FIG. 4 is a graph illustrating the relationship between a total disparity of a first image and a second image on the display panel and the viewing distance that can provide a more comfortable viewing experience.
Figure 5:
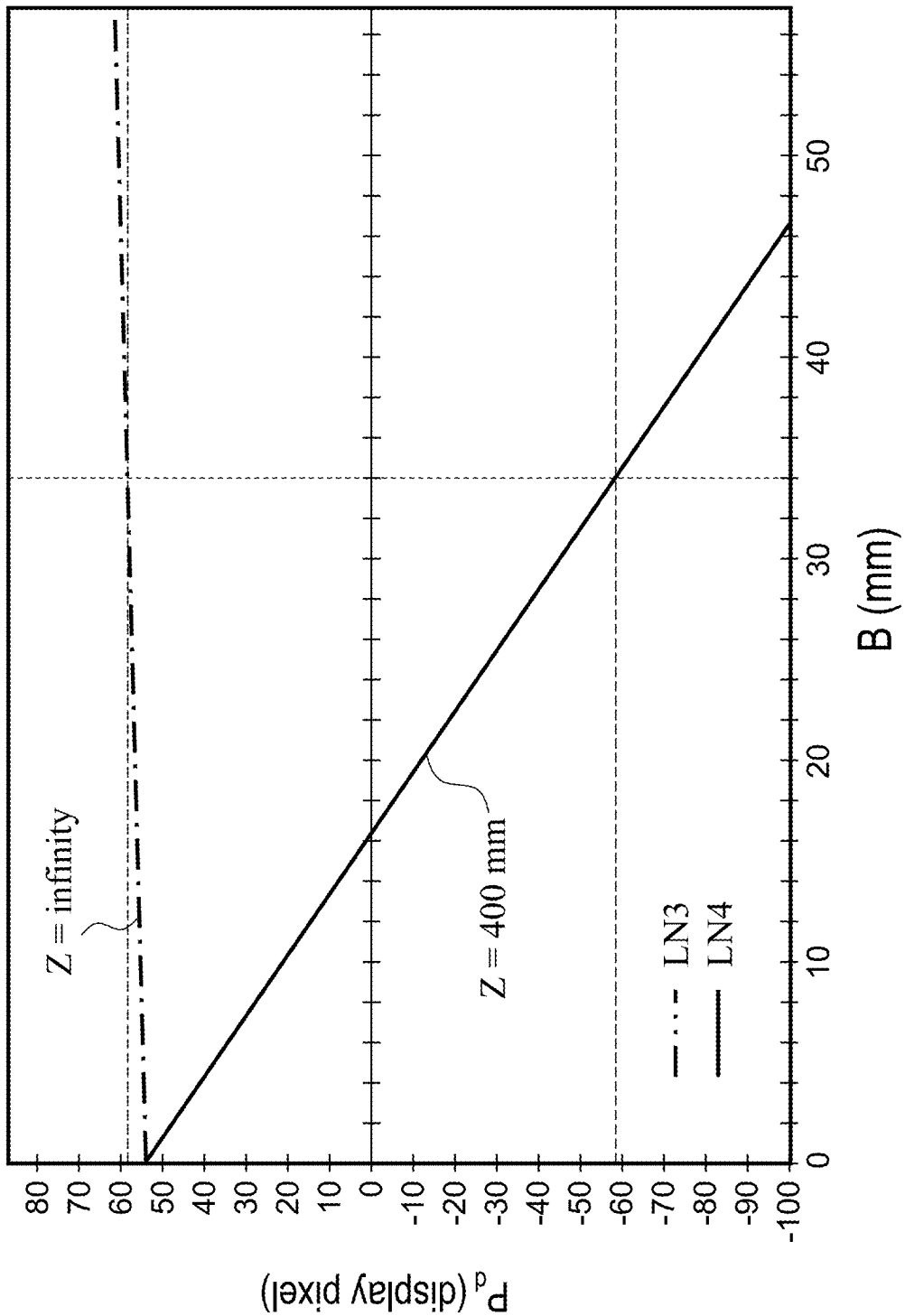
FIG. 5 is a graph illustrating the relationship between a total disparity of a first image and a second image of a nearest/farthest target object to be photographed on a display panel and a distance between a first nodal point and a second nodal point.
Figure 6:
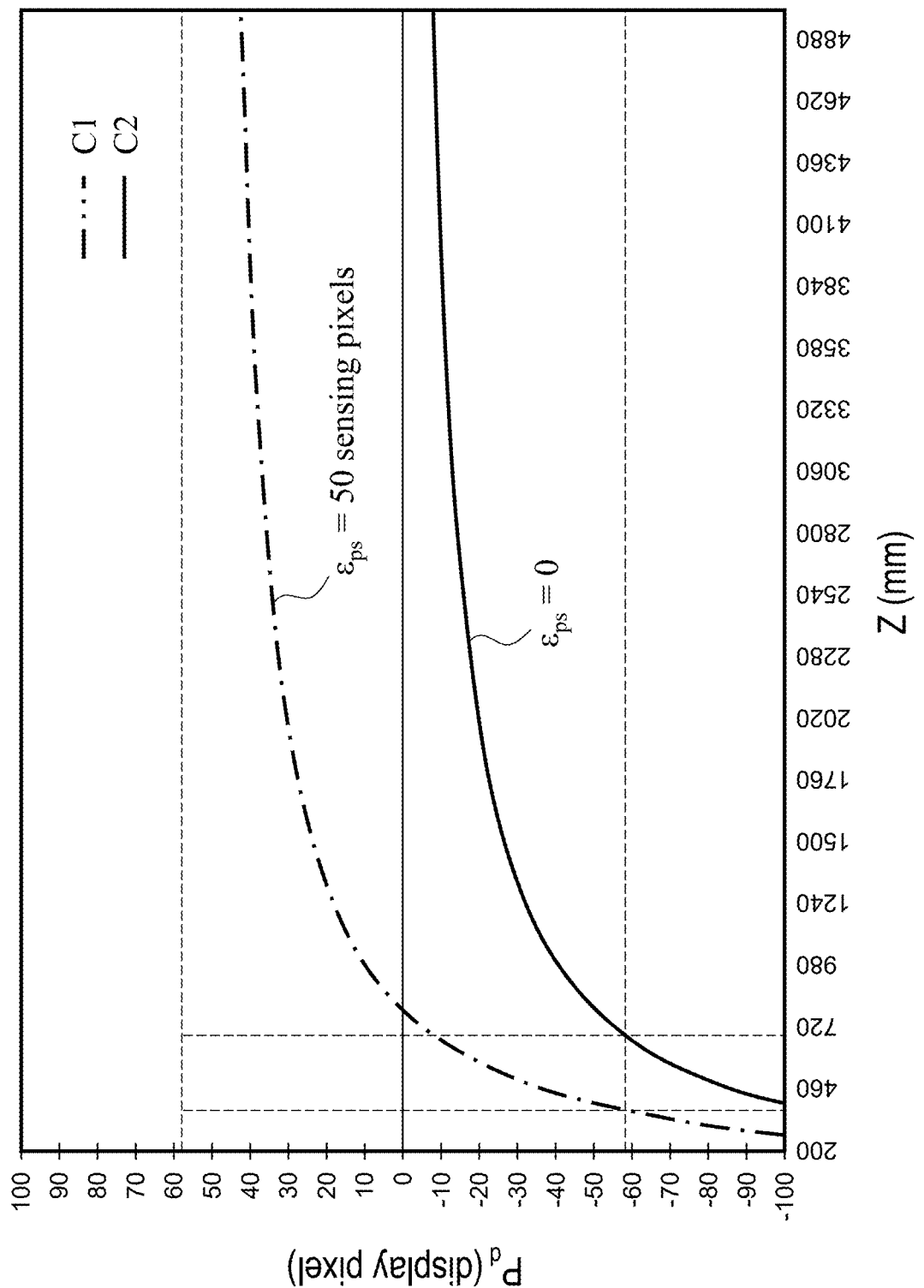
FIG. 6 is a graph illustrating the relationship between a total disparity of a first image and a second image on a display panel and a photographing distance of a target object according to lens images captured by the stereo camera of FIG. 1 and the stereo camera of the comparative example of FIG. 2.
Figure 7:
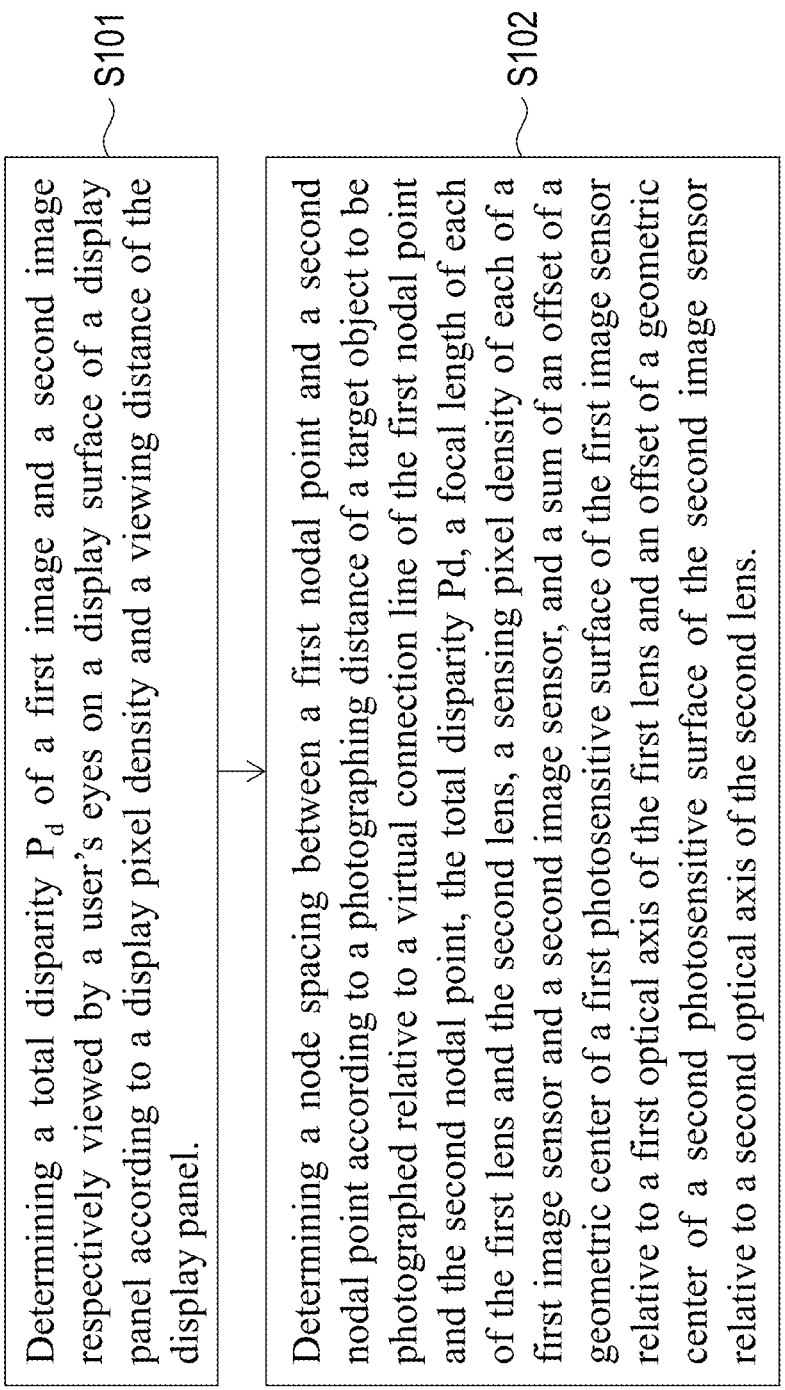
FIG. 7 is a design flow chart of a stereo camera according to an embodiment of the disclosure.

FIG. 4 is a graph illustrating the relationship between a total disparity of a first image and a second image on the display panel and the viewing distance that can provide a more comfortable viewing experience. FIG. 5 is a graph illustrating the relationship between a total disparity of a first image and a second image of a nearest/farthest target object to be photographed on a display panel and a distance between a first nodal point and a second nodal point. FIG. 6 is a graph illustrating the relationship between a total disparity of a first image and a second image on a display panel and a photographing distance of a target object according to lens images captured by the stereo camera of FIG. 1 and the stereo camera of the comparative example of FIG. 2. FIG. 7 is a design flow chart of a stereo camera according to an embodiment of the disclosure.

A design method of the stereo camera 10 will be exemplarily described below.

First, determining a total disparity P$_d$ of the first image and the second image respectively viewed by the left eye LEYE and the right eye REYE of a user USR on the display surface DS of the display panel DP according to a display pixel density and a viewing distance of the display panel DP (i.e., step S101 in FIG. 7).

Referring to FIG. 3 and FIG. 4, the lines LN1 and LN2 in FIG. 4 are plotted according to the aforementioned relation 2 when the target object image OBJ_IM is presented at a front boundary (i.e., the included angle θ1 is −0.5°) and a rear boundary (i.e., the included angle θ2 is +0.5°) of the comfort region CFR. For example, in the embodiment, the display panel DP is a 15.6-inch display screen whose display surface DS has a width Wd of 344.22 mm, and the display pixel resolution is 1920*1080. If the target object image OBJ_IM is to be imaged within the comfort region CFR when the viewing distance d of the display panel DP is set to 600 mm, the total disparity P$_d$ of the first image and the second image on the display surface DS have to be between +58 display pixels and −58 display pixels.

Referring to FIG. 1, next, determining a node spacing B between the first nodal point NP1 and the second nodal point NP2 according to the photographing distance Z of the target object OBJ to be photographed relative to the virtual connection line VC1 of the first nodal point NP1 of the first lens LENS1 and the second nodal point NP2 of the second lens LENS2, the total disparity P$_d$, the focal length f of each of the first lens LENS1 and the second lens LENS2, the sensing pixel density of each of the first image sensor SD1 and the second image sensor SD2, and the sum ε$_{ps}$ of the offset ε$_1$ of the geometric center GC1 of the first photosensitive surface PSS1 of the first image sensor SD1 relative to a first optical axis OA1 of the first lens LENS1 and the offset 82 of the geometric center GC2 of the second photosensitive surface PSS2 of the second image sensor SD2 relative to a second optical axis OA2 of the second lens LENS2 (i.e., step S102 in FIG. 7).

It should be particularly noticed that the total disparity $P_d$ in step S102 is the total disparity $P_d$ of the first image and the second image of the target object image OBJ_IM whose imaging depth falls within the comfort region CFR in step S101.

Referring to FIG. 1, FIG. 3 and FIG. 5, the lines LN3 and LN4 in FIG. 5 are plotted according to the aforementioned relation 1, relation 2 and relation 3 when the photographing distance Z of the target object OBJ is infinity and 400 mm, respectively. For example, in the embodiment, the focal length f of each of the first lens LENS1 and the second lens LENS2 is 1.37 mm. The width Wc of the photosensitive surface of each of the first image sensor SD1 and the second image sensor SD2 is 6.45 mm, and the sensing pixel resolution is 1920*1080.

In the embodiment, the sum $\varepsilon_{ps}$ of the offset $\varepsilon_1$ of the geometric center GC1 of the first photosensitive surface PSS1 relative to the first optical axis OA1 of the first lens LENS1 and the offset $\varepsilon_2$ of the geometric center GC2 of the second photosensitive surface PSS2 relative to the second optical axis OA2 of the second lens LENS2 is, for example, 50 sensing pixels, but the disclosure is not limited thereto.

It can be observed from FIG. 5 that the total disparity $P_d$ of the first image and the second image on the display surface DS can be maintained between +58 display pixels and −58 display pixels when the node spacing B between the first nodal point NP1 and the second nodal point NP2 does not exceed 34 mm. At this point, the parameter design of the stereo camera 10 is completed.

Referring to FIG. 1, FIG. 3 and FIG. 6, the curves C1 and C2 in FIG. 6 are respectively plotted for the stereo camera 10 of the embodiment and the stereo camera 10C of the comparative example of FIG. 2 according to the aforementioned relation 1, relation 2 and relation 3. The sum $\varepsilon_{ps}$ of the comparative example is zero. The sum $\varepsilon_{ps}$ of the embodiment is 50 sensing pixels, and the node spacing B in each of the comparative example and the embodiment is 33 mm.

It can be observed from FIG. 6 that in the comparative example (i.e., $\varepsilon_{ps}$ is zero), if the photographing distance Z of the target object OBJ is less than 700 mm, the total disparity $P_d$ of the first image and the second image on the display surface DS will exceed −58 display pixels due to the geometric center of the photosensitive surface of the camera module is not offset from the optical axis of the lens. In that case, the user may experience uncomfortable symptoms such as dizziness or nausea when viewing the target object image OBJ_IM. On the other hand, the total disparity $P_d$ of the first image and the second image on the display surface DS will approach zero when the photographing distance Z of the target object OBJ is infinity. In other words, the images captured by the stereo camera 10C of the comparative example fail to present the target object image sinking into the rear of the display panel DP, resulting in a poor sense of depth perception in stereoscopic vision.

On the contrary, since the geometric center of the photosensitive surface of the camera module of the embodiment is offset from the optical axis of the lens (for example, $\varepsilon_{ps}$ is 50 sensing pixels), the photographing distance Z of the target object OBJ have to be less than 375 mm to make the total disparity $P_d$ of the first image and the second image on the display surface DS exceeds −58 display pixels. The total disparity $P_d$ of the first image and the second image on the display surface DS will approach +58 display pixels when the photographing distance Z of the target object OBJ is infinity. That is, the target object image captured by the stereo camera 10 of the embodiment can be imaged at any position in the comfort region CFR (i.e., the total disparity $P_d$ in FIG. 6 is within a range of +58 display pixels to −58 display pixels) through the display panel DP, and thereby improving the depth perception and comfort of stereoscopic vision.

To sum up, in the stereo camera and the design method thereof of an embodiment of the disclosure, two optical axes of two lens spaced apart are parallel to each other, and a geometric center of a photosensitive surface of each of two image sensors disposed corresponding to the two lens is offset from the optical axis of the corresponding lens. According to the application requirements of different products, the offset of the geometric center of the photosensitive surface relative to the optical axis of the lens can be adjusted to allow captured images of the target object to be displayed with appropriate depth distribution in front of the user through the display panel, and thereby improving the comfort of the user's stereoscopic vision.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A stereo camera, comprising:
   a first lens, having a first nodal point and a first optical axis passing through the first nodal point;
   a second lens, having a second nodal point and a second optical axis passing through the second nodal point, wherein the first lens and the second lens are spaced apart along a lens arrangement direction;
   a first image sensor, disposed corresponding to the first lens and having a first photosensitive surface; and
   a second image sensor, disposed corresponding to the second lens and having a second photosensitive surface, wherein the first optical axis is parallel to the second optical axis, a geometric center of the first photosensitive surface is offset from the first optical axis along the lens arrangement direction, and a geometric center of the second photosensitive surface is offset from the second optical axis along the lens arrangement direction,
   wherein the first image sensor is adapted to capture a first lens image of a target object through the first lens, the second image sensor is adapted to capture a second lens image of the target object through the second lens, a photographing distance of the target object relative to a virtual connection line of the first nodal point and the second nodal point is Z, a node spacing between the first nodal point and the second nodal point is B, a focal length of each of the first lens and the second lens is f, a total disparity of the first lens image and the second lens image is $P_c$, a sum of an offset of the geometric center of the first photosensitive surface relative to the first optical axis and an offset of the geometric center of the second photosensitive surface relative to the second optical axis is Eps, and the stereo camera satisfies the following relationship:

$$\varepsilon_{ps} = P_c - \left(\frac{f \times B}{Z}\right) \times m_c,$$

wherein $m_c$ is a sensing pixel density of each of the first photosensitive surface and the second photosensitive surface along the lens arrangement direction,
- a display panel is adapted to display a first image and a second image on a display surface according to the first lens image and the second lens image, respectively, a viewing distance between the display surface and a virtual connection line of a user's eyes is d, the eyes are spaced apart along an arrangement direction of eyes, a total disparity of the first image and the second image on the display surface is $P_d$, and the stereo camera satisfies the following relationship:
- $P_d = \pm 2d \times \tan(0.5°) \times m_d$, wherein $m_d$ is a display pixel density of the display surface along the arrangement direction of eyes,
- the total disparity of the first lens image and the second lens image and the total disparity of the first image and the second image on the display surface satisfy the following relationship:
- $P_d = P_c \times S$, wherein S is a ratio of the number of display pixels of the display panel arranged in a row along the arrangement direction of eyes to the number of sensing pixels of each of the first image sensor and the second image sensor arranged in a row along the lens arrangement direction.

2. The stereo camera according to claim 1, wherein an offset direction of the geometric center of the first photosensitive surface relative to the first optical axis is opposite to an offset direction of the geometric center of the second photosensitive surface relative to the second optical axis, and the offset of the geometric center of the first photosensitive surface relative to the first optical axis is equal to the offset of the geometric center of the second photosensitive surface relative to the second optical axis.

3. A design method for a stereo camera, comprising:
- determining a total disparity $P_d$ of a first image and a second image respectively viewed by a user's eyes on a display surface of a display panel according to a display pixel density and a viewing distance of the display panel; and
- determining a node spacing between a first nodal point of a first lens and a second nodal point of a second lens of the stereo camera according to a photographing distance of a target object to be photographed relative to a virtual connection line of the first nodal point and the second nodal point, the total disparity $P_d$, a focal length of each of the first lens and the second lens, a sensing pixel density of each of a first image sensor and a second image sensor of the stereo camera, and a sum of an offset of a geometric center of a first photosensitive surface of the first image sensor relative to a first optical axis of the first lens and an offset of a geometric center of a second photosensitive surface of the second image sensor relative to a second optical axis of the second lens, wherein the first optical axis passes through the first nodal point, the second optical axis passes through the second nodal point, and the first optical axis is parallel to the second optical axis,
- wherein the first image sensor is adapted to capture a first lens image of the target object through the first lens, the second image sensor is adapted to capture a second lens image of the target object through the second lens, the photographing distance of the target object is Z, the node spacing between the first nodal point and the second nodal point is B, the focal length of each of the first lens and the second lens is f, a total disparity of the first lens image and the second lens image is $P_c$, the sum of the offset of the geometric center of the first photosensitive surface relative to the first optical axis and the offset of the geometric center of the second photosensitive surface relative to the second optical axis is Eps, and the stereo camera satisfies the following relationship:

$$\varepsilon_{ps} = P_c - \left(\frac{f \times B}{Z}\right) \times m_c,$$

wherein $m_c$ is the sensing pixel density of each of the first photosensitive surface and the second photosensitive surface along an arrangement direction of the first lens and the second lens,
- the total disparity $P_d$ of the first image and the second image on the display surface satisfies the following relationship:
- $P_d = \pm 2d \times \tan(0.5°) \times m_d$, wherein $m_d$ is the display pixel density of the display surface along an arrangement direction of the user's eyes, and d is the viewing distance between the display surface and a virtual connection line of the user's eyes,
- the total disparity $P_c$ of the first lens image and the second lens image and the total disparity $P_d$ of the first image and the second image on the display surface satisfy the following relationship:
- $P_d = P_c \times S$, wherein S is a ratio of the number of display pixels of the display panel arranged in a row along the arrangement direction of the user's eyes to the number of sensing pixels of each of the first image sensor and the second image sensor arranged in a row along the arrangement direction of the first lens and the second lens.

4. The design method for the stereo camera according to claim 3, wherein an offset direction of the geometric center of the first photosensitive surface relative to the first optical axis is opposite to an offset direction of the geometric center of the second photosensitive surface relative to the second optical axis, and the offset of the geometric center of the first photosensitive surface relative to the first optical axis is equal to the offset of the geometric center of the second photosensitive surface relative to the second optical axis.

* * * * *